Dec. 30, 1969    M. BERANEK    3,487,201
COMPENSATOR FOR THERMOELECTRIC CONTROL CIRCUIT
Filed April 12, 1968    2 Sheets-Sheet 1

INVENTOR.
Milan Beranek
BY

United States Patent Office 3,487,201
Patented Dec. 30, 1969

3,487,201
COMPENSATOR FOR THERMOELECTRIC CONTROL CIRCUIT
Milan Beranek, Prague, Czechoslovakia, assignor to Tesla, narodni podnik, Prague, Czechoslovakia
Filed Apr. 12, 1968, Ser. No. 721,018
Int. Cl. H05b 1/02, 3/02
U.S. Cl. 219—494       7 Claims

ABSTRACT OF THE DISCLOSURE

A compensating device for thermoelectric furnace temperature controls has two identical metal shells and two heating coils of identical ohmic resistance respectively mounted in the shells. One element is separated from the enclosing shell by a thin insulating layer (mica), the other one by a thick layer of insulating material of high heat capacity. The heating coils are arranged in parallel in a common heating circuit. Two thermocouples in series circuit with opposite polarity sense the respective temperatures of the shells.

BACKGROUND OF THE INVENTION

This invention relates to automatic temperature controls for electrically heated furnaces or the like, and particularly to devices compensating for the time lag with which the temperature of a furnace and the like normally responds to changes in the supplied heating energy.

Known devices of this type have a pair of auxiliary thermocouples outside the furnace and arranged in a series circuit with opposite polarities. The pair is inserted in the circuit between the furnace thermocouple and the controller for the heating current of the furnace so that the output voltage of one auxiliary thermocouple augments the output of the furnace thermocouple and the output of the other auxiliary thermocouple reduces the output of the furnace couple. Individual heaters for the axiliary thermocouples are operated by a control switch mechanically linked to the on-off switch of the furnace heater in such a manner that the furnace heater is switched off before the set temperature is reached, and is switched on again before the furnace temperature actually reaches the set minimum temperature. The known devices provide a desirable reduction in the actual temperature range of the controlled furnace.

The known devices are limited in their application to furnaces equipped with on-off controls in their heating circuits, or at most. To heating circuits in which energy is supplied on a few distinct levels. They are inherently inoperative in furnace heating circuits with continuous input variation as will presently become apparent.

A primary object of the invention is the provision of a compensating device of the type described which avoids this shortcoming but is also suitable for use with furnace controls of the on-off type.

SUMMARY OF THE INVENTION

With this object and others in view, as will hereinafter become apparent, the invention provides a compensating device in which two heater assemblies each include a body of thermally conductive material connected to a resistance heating element for transfer of heat therebetween. The heat capacity and rate of heat transfer of the connection are smaller in one assembly than in the other.

Two thermoelectric sensing devices in thermal contact with the bodies sense their temperatures and generate voltage signals in response to the sensed temperatures. They are conductively connected with opposite polarities.

The device described in the preceding paragraph may replace the known compensator for the same purpose, but is also useful for use in a heating arrangement in which the heating current may be varied continuously.

The exact nature of this invention as well as other objects and advantages thereof will be readily apparent from consideration of the following specification relating to the annexed drawings.

DESCRIPTION OF THE PRIOR ART

Figure 1:
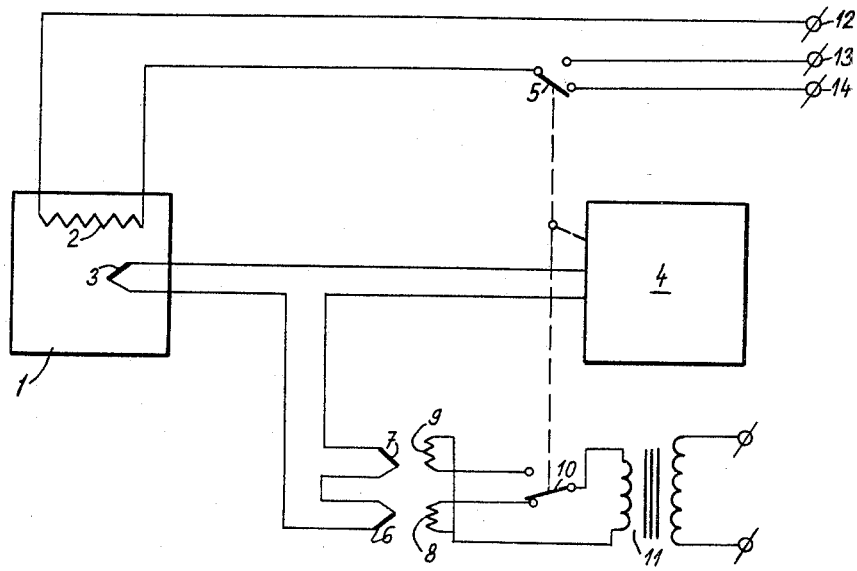
FIG. 1 diagrammatically illustrates a known thermoelectric furnace temperature control arrangement with stepwise control of the heating current.

For a better understanding of this invention, FIG. 1 diagrammatically illustrates a know automatic temperature control system with the improvement of which this invention is concerned.

A furnace 1 is being heated by an electric resistance element 2. The furnace temperature is sensed by a thermocouple 3 which is connected to an automatic control unit 4. A single-pole double throw switch 5 in the energizing circuit of the heating element 2 is operated by the unit 4.

Two auxiliary thermocouples 6, 7 are series-connected with opposite polarities outside the furnace in one of the leads from the furnace thermocouple 3 to the control unit 4. Heating coils 8, 9 are arranged adjacent the couples 6, 7 respectively. A single-pole double-throw switch 10 alternatively connects the coils 8, 9 to the secondary winding of a step-down transformer 11. The switch 10 is mechanically coupled to the switch 5.

The furnace heating element 2 is energized by a transformer of which only the terminals 12, 13, 14 of the secondary winding are shown, the terminal 13 being connected to an intermediate tap. In the illustrated position of the coupled switches 5, 10, the full transformer voltage is applied to the heating element 2 from the terminals 12, 14. The coil 8 is connected to the transformer 11 and raises the temperature of the thermocouple 6 above that of the unheated thermocouple 7. The combined voltage signal of the thermocouples 3, 6, 7 is higher than that of the thermocouple 3 alone.

As the furnace temperature increases, the control unit 4 changes the position of the switches 5, 10 shortly before the set temperature is reached. Lower voltage is thereafter applied to the heating element 2 from the terminals 12, 13, the heating coil 8 is deenergized, and current is supplied to the coil 9 from the transformer 11. The combined output voltage of the thermocouples 3, 6, 7 thereafter is lower than that of the furnace couple 3, because the output of the heated auxiliary couple 7 is higher than that of the cold couple 6 and is opposed to the output of the furnace couple 3. The control unit 4 is again actuated before the furnace temperature drops to the set value.

The known arrangement thus reduces the temperature fluctuations occurring in a furnace desired to be run at constant temperature by means of a control unit which can respond only to input voltage differences of a fixed magnitude.

DESCRIPTION OF THE PREFERRED EMBODIMENT

Figure 2:
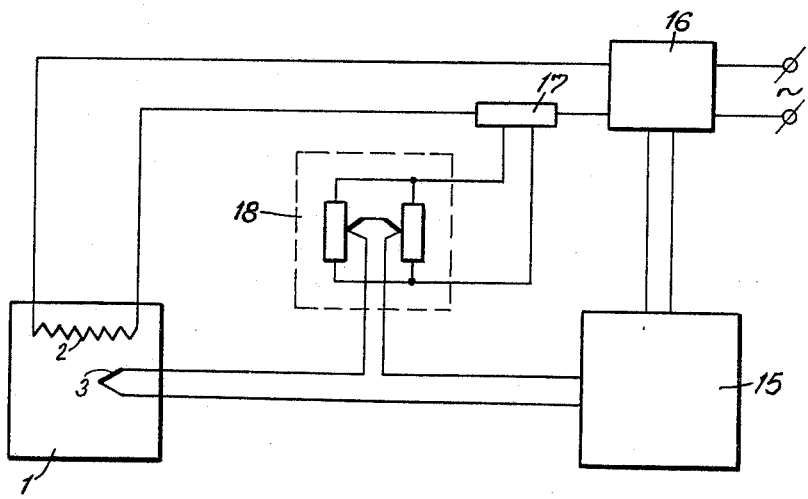
FIG. 2 diagrammatically illustrates a similar arrangement with continuous variation of the heating current and employing the compensating device of the invention.

While the apparatus shown in FIG. 1 has been found very effective, it is not useful in a furnace equipped with continuous controls, as is shown in FIG. 2. The furnace 1 equipped with a resistance heating element 2 and a thermocouple 3 is provided with heating current under the control of a unit 15, conventional in itself, which operates a continuously variable transformer 16, as is also conventional. A shunt 17 in one of the leads between the transformer 16 and the heating element 2 provides power for a compensating device 18 with which this invention is more specifically concerned.

Figure 3:
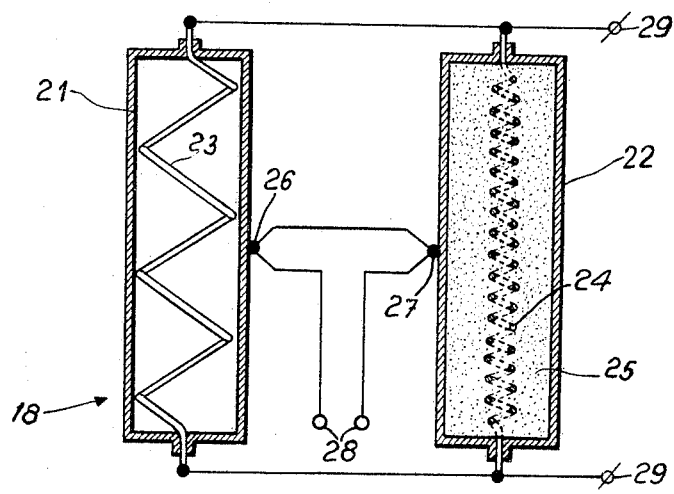
FIG. 3 shows the compensating device of FIG. 2 in elevational section.

As is better seen in FIG. 3, the compensating device 18 includes two identical, cylindrical metal shells 21, 22. The shell 21 is filled with air except for a heating coil 23 of an alloy whose electrical conductivity remains substantially unchanged over the range of operating temperatures of the heater assembly constituted by the shell 21 and the coil 23. The coil is mounted in coaxial insulators, not shown for the sake of simplicity, which are provided in the radical end faces of the shell 21, and its outer diameter is only slightly smaller than the inner diameter of the shell 21.

The other heater assembly includes a heating coil 24 whose outer diameter is but a small fraction of the inner diameter of the shell 22. The space in the shell 22 about the slim coil 24 is packed with granular fused aluminum oxide (corundum) 25 which is a thermal insulator and has a fairly high heat capacity. The coil 24 is mounted in non-illustrated insulators as described above, and it consists of the same length of the same wire as the coil 23. The electrical resistances of the two coils 23, 24 are thus practically the same at all times.

Wires of dissimilar metals are welded to each other at 26, 27 to form two identical thermocouples which are in direct thermal contact with the outer faces of the shells 21, 22 and are arranged in series circuit with opposing polarities. The thermocouple circuit is provided with terminals 28 on the housing, not itself shown, which supports the operating elements seen in FIG. 3, and the coils 23, 24 are connected in parallel to another set of terminals 29. In the arrangement illustrated in FIG. 2, the terminals 28 are respectively connected to the furnace thermocouple 3 and the control unit 15, and the terminals 29 are connected to the two ends of the shunt 17.

The compensating device shown in FIG. 3 operates as follows:

When the furnace circuit is energized, the shell 21 is quickly heated by the coil 23 to which it is thermally connected by a thin intervening layer of mica of relatively good heat transfer properties and negligible heat capacity. While the same amount of thermal energy is simultaneously released by the coil 24, it is consumed mainly in heating the granular aluminum oxide packing 25. The shell 22 is practically at the temperature of the ambient air when the shell 21 reaches its maximum temperature at which the heat supplied by the coil 23 is equal to the heat dissipated from the shell 21 to the environment. The full output voltage of the thermocouple 26 is provided at the terminals 28, and boosts the output voltage of the furnace couple 3.

Gradually, the shell 22 approaches the same maximum temperature as the shell 21 at which caloric energy is transmitted from the exposed faces of the shells 21, 22 to the common environment at a practically equal rate because of the identical size and configuration of the two exposed surfaces. The delay with which this state is reached can be selected to suit specific operating conditions by varying the amount and composition of the thermal insulating material 25 in the shell 22, the spacing of the coil 24 from the shell 22, and in other obvious ways. In thermal equilibrium of the compensating device, zero voltage is produced at the terminals 28, and the control unit 15 receives the unchanged voltage output of the furnace couple 3.

When the current supply to the furnace is reduced, the current to the coils 23, 24 is proportionally weakened. The current to the coils 23, 24 is proportionally weakened. The temperature of the shell 21 drops faster than that of the shell 22 because of the heat stored in the aluminum oxide 25, and the voltage applied by the two thermocouples 26, 27 to the terminals 28 opposes the output of the furnace couple 3.

The compensating device of the invention thus responds to all changes in the heating current without the use of a mechanical switch. It responds not only to changes in heating current which are produced by the control unit 15, but also to fluctuations in line voltage.

While thermocouples have been illustrated in the drawing and described in this specification, it will be appreciated that thermoelectric elements other than thermocouples may replace the auxiliary thermocouples 26, 27 without significantly changing the function of the device. It is simplest from the manufacturer's point of view to make the shells 21, 22 of the same metal in the same shape and size, but identical shells are not necessary if corresponding compensating changes are made elsewhere in the apparatus, for example, in the nature and dimensions of the coils 23, 24 which also need not necessarily be of the same wire wound in equal lengths. Wide variations in the thermal connections between the coils and the shells are obviously possible, and those illustrated and described above are merely representative of preferred practice at this time.

It should be understood, therefore, that the foregoing disclosure relates only to preferred embodiments of the invention, and that it is intended to cover all changes and modifications of the example of the invention herein chosen for the purpose of the disclosure which do not constitute departures from the spirit and scope of the invention set forth in the appended claims.

What is claimed is:
1. In a compensating device in combination:
  (a) a source of heating current;
  (b) a first heater assembly;
  (c) a second heater assembly, each of said assemblies including:
    (1) a body of thermally conductive material,
    (2) a resistance heating element conductively connected to said source,
    (3) thermal connecting means connecting said body and said heating element for transfer of heat therebetween,
    (4) the heat capacity of the connecting means in said first assembly being smaller than the heat capacity of the connecting means in said second assembly,
    (5) the rate of heat transfer of the connecting means in said first assembly being higher than the thermal conductivity of the connecting means in said second assembly;
  (d) two thermoelectric means in thermal contact with said bodies respectively for sensing the temperatures of said bodies and for generating voltage signals in response to the sensed temperatures; and
  (e) conductive means connecting said thermoelectric means in series circuit, the voltage signals of said thermoelectric means opposing each other in said circuit at equal sensed temperatures.

2. In a device as set forth in claim 1, said bodies having respective exposed face means for transmitting caloric energy to a common environment at a substantially equal rate when said face means are at the same temperature.

3. In a device as set forth in claim 2, the face means of said bodies having exposed surfaces of substantially identical size and configuration.

4. In a device as set forth in claim 2, said elements having substantially the same resistance to passing electric current.

5. In a device as set forth in claim 1, said connecting means in said second assembly including thermal insulating means interposed between said body and said element thereof.

6. In a device as set forth in claim 1, the spacing of said element from said body being substantially greater in said second assembly than in said first assembly.

7. In a device as set forth in claim 1, each of said bodies constituting a shell substantially enclosing the associated element and connecting means.

References Cited

UNITED STATES PATENTS

| | | | |
|---|---|---|---|
| 2,450,983 | 10/1948 | Osterherd | 219—494 |
| 2,656,525 | 10/1953 | Kinsella | 219—494 |
| 3,396,265 | 8/1968 | Jacobson | 219—494 X |
| 2,138,593 | 11/1938 | Breitenstein | 73—341 X |
| 2,446,283 | 8/1948 | Hulsberg | 73—341 X |
| 3,251,654 | 5/1966 | Palmer | 73—359 |

BERNARD A. GILHEANY, Primary Examiner

F. E. BELL, Assistant Examiner

U.S. Cl. X.R.

73—359; 136—230; 236—68